(12) United States Patent
Keller

(10) Patent No.: US 7,012,535 B2
(45) Date of Patent: Mar. 14, 2006

(54) BATTERY OPERATED WARNING SENSOR

(76) Inventor: John Keller, 409 N. Anderson St., Bismarck, ND (US) 58501

( * ) Notice: Subject to any disclaimer, the term of this patent is extended or adjusted under 35 U.S.C. 154(b) by 0 days.

(21) Appl. No.: 10/657,500

(22) Filed: Sep. 8, 2003

(65) Prior Publication Data

US 2004/0066304 A1  Apr. 8, 2004

Related U.S. Application Data

(63) Continuation-in-part of application No. 09/966,569, filed on Sep. 26, 2001, now Pat. No. 6,617,971.

(51) Int. Cl.
*G08B 19/02* (2006.01)

(52) U.S. Cl. ...................... 340/581; 340/584; 340/593; 200/179; 200/56 R

(58) Field of Classification Search ................ 340/581, 340/584, 585, 586, 593, 594, 595, 597, 602, 340/612, 815.62, 815.78, 815.86, 815.89; 374/183; 73/204.19, 204.22; 200/179, 19.03, 200/19.18, 56 R
See application file for complete search history.

(56) References Cited

U.S. PATENT DOCUMENTS

| | | | |
|---|---|---|---|
| 489,259 A | 1/1893 | Maxim et al. ............... 337/309 |
| 2,523,352 A | 9/1950 | Behr ......................... 200/56 R |
| 3,656,138 A | 4/1972 | Hamma ....................... 177/48 |
| 3,888,121 A | 6/1975 | Geldmacher ................. 374/188 |
| 3,952,692 A | 4/1976 | Griggs ....................... 116/102 |
| 4,016,536 A | 4/1977 | La Chapelle ................ 340/441 |
| 4,233,750 A | 11/1980 | Cheng ....................... 337/374 |
| 4,396,301 A | 8/1983 | Stucki ....................... 374/188 |
| 4,612,537 A | 9/1986 | Maltais et al. .............. 340/596 |
| 4,969,508 A | 11/1990 | Tate et al. .................. 165/209 |
| 5,169,236 A | 12/1992 | Iest ............................ 374/156 |
| 5,379,637 A * | 1/1995 | Abowd et al. ............ 73/290 R |
| 5,698,974 A * | 12/1997 | Van Dyke et al. .......... 324/144 |
| 5,700,956 A * | 12/1997 | Huang ........................ 73/735 |
| 5,917,416 A | 6/1999 | Read .......................... 340/584 |
| 5,973,602 A | 10/1999 | Cole, III et al. ............ 340/584 |
| 6,034,607 A | 3/2000 | Vidaillac .................... 340/585 |
| 6,053,633 A | 4/2000 | Bilenker ..................... 374/156 |
| 6,089,086 A * | 7/2000 | Swindler et al. ............. 73/317 |
| 6,536,295 B1 * | 3/2003 | Hamilton et al. .......... 73/866.3 |
| 6,822,565 B1 * | 11/2004 | Thomas et al. ........... 340/539.1 |
| 6,825,770 B1 * | 11/2004 | Miller et al. ................ 340/626 |

* cited by examiner

*Primary Examiner*—Toan N. Pham
(74) *Attorney, Agent, or Firm*—TraskBritt

(57) ABSTRACT

An alarm device for signaling when an object reaches a specified condition. The alarm device includes a sensor for detecting the condition of the object. The device further includes a switch element which is closed when the sensor indicates the specified condition. The closed switch element triggers an alarm which will signal a person monitoring the condition that the specified condition has been reached.

20 Claims, 7 Drawing Sheets

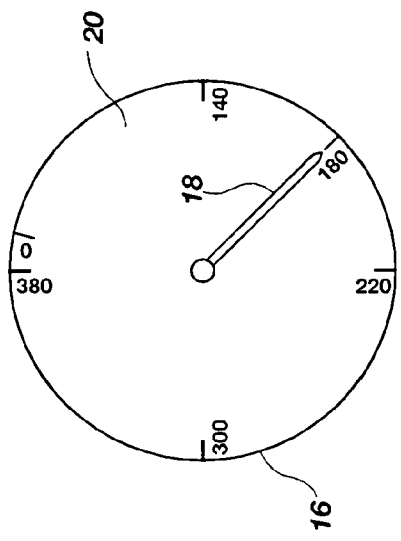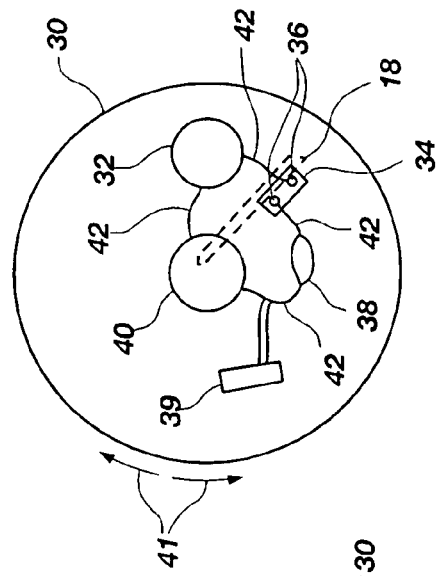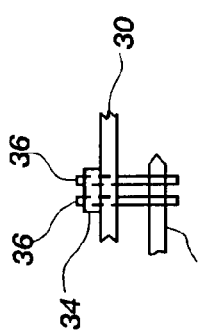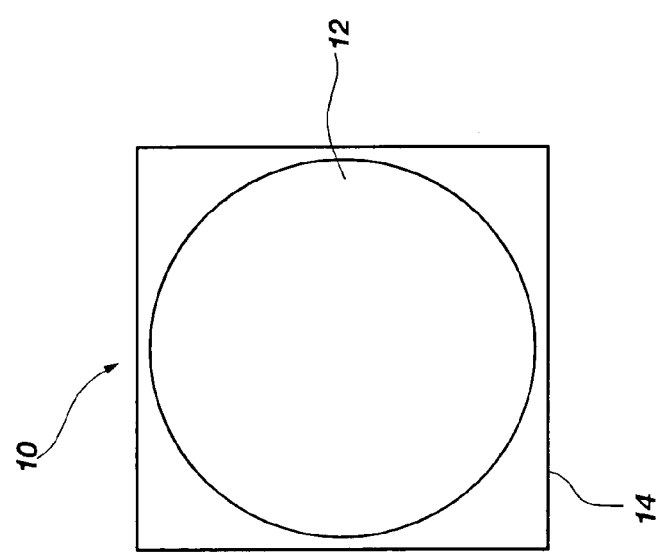

BATTERY OPERATED WARNING SENSOR

CROSS-REFERENCE TO RELATED APPLICATIONS

This application is a continuation-in-part of U.S. patent application Ser. No. 09/966,569 filed Sep. 26, 2001, now U.S. Pat. No. 6,617,971, issued Sep. 9, 2003, the disclosure of which is incorporated herein in its entirety.

FIELD OF THE INVENTION

The present invention relates to sensing devices. In particular, the present invention relates to sensing devices that activate a warning signal when a specified condition is reached. More particularly, the present invention relates to a thermometer with a needle, where the needle activates a warning signal when a specified temperature is reached.

BACKGROUND OF THE INVENTION

Temperature-sensing devices are well known and widely used in many industrial and consumer applications. Temperature sensing is important for many industries, including food production, where the food can spoil if the proper temperature is not maintained. Cooks can also use a temperature-sensing device to monitor the temperature of a grill, other cooking device, or food being cooked. Temperature sensing is also important in industries that use motors and other types of mechanical machinery because high temperatures which may be generated by these devices can shorten the life of the devices or cause a fire if the high temperature goes undetected. Temperature-sensing devices are also utilized in scientific experiments that require the monitoring of the temperature.

The prior art discloses many temperature-sensing devices where a user can simply look at the device to check the temperature. For example, a simple thermometer can be used. However, these devices are inefficient to use because they require constant monitoring. If a user becomes preoccupied with another task, the temperature can rise undetected and cause damage before the elevated temperature is noticed by the user. The prior art also discloses more complex temperature-sensing devices where some sort of warning signal is emitted. In one example, a plurality of temperature sensors is placed in various locations in an industrial plant. The temperature sensors are hard wired to a centralized monitoring system where the temperature is monitored. However, the hard wiring of the temperature sensors makes the system susceptible to damage from routine maintenance in the plant because a wire could be damaged during the maintenance.

A temperature-sensing device that is durable, contains no external components that can be damaged, is inexpensive to manufacture, is portable, and emits a warning signal that is readily detectable would thus be an improvement in the art.

SUMMARY OF THE INVENTION

In one exemplary embodiment, an alarm device for notifying a person of a sensed condition is disclosed. The alarm device includes a monitoring device comprising a sensor and a rotatable elongate element for indicating the sensed condition. The rotatable elongate element is rotated in response to the condition sensed by the sensor and a portion of the rotatable elongate element is electrically conductive. The alarm device also comprises a circuit connecting a power source, at least one switch element and at least one warning device configured to emit a signal when an electric current reaches the at least one warning device. The at least one switch element is positioned relative to the rotatable elongate element such that when a selected condition is sensed by the sensor, the rotatable elongate element physically contacts the at least one switch element and allows an electric current to pass through the rotatable elongate element. The at least one switch element is further configured to rotate such that the selected condition at which the rotatable elongate element contacts the at least one switch element is adjustable.

In another exemplary embodiment, an alarm device having a monitoring device is disclosed. The monitoring device comprises a sensor and a rotatable elongate element for indicating a sensed condition, wherein the sensor causes the rotatable elongate element to rotate in response to a change in the sensed condition. The alarm device also includes a circuit that connects a power source, at least one switch element, at least one latch circuit and at least one warning device. The at least one switch element is positioned relative to the rotatable elongate element such that when a selected condition is sensed by the sensor, the rotatable elongate element contacts the at least one switch element, thus allowing an electric current from the power source to pass through the rotatable elongate element. The at least one warning device is configured to emit a signal when the electric current is transmitted to the at least one warning device.

In a further exemplary embodiment, a temperature-sensing device including a dial-type thermometer is disclosed. The dial-type thermometer includes a temperature sensor and a rotatable elongate element for indicating a sensed temperature. The rotatable elongate element is rotatable by the temperature sensor responsive to a change in the sensed temperature. At least a portion of the rotatable elongate element is electrically conductive. The temperature-sensing device also includes a circuit that connects a power source, at least one switch element and at least one warning device. The at least one switch element is positioned relative to the rotatable elongate element such that when a selected temperature is sensed by the temperature sensor, the rotatable elongate element physically contacts the at least one switch element and allows current from the power source to pass through the rotatable elongate element. The at least one switch element is further configured to rotate in order to adjust the selected temperature at which the rotatable elongate element contacts the at least one switch element.

DESCRIPTION OF THE DRAWINGS

FIG. 1 is a top view of one exemplary embodiment of the present invention;

FIG. 2A is a top view of the dial thermometer used in the device of FIG. 1;

FIG. 2B is a top view of the circuit board used in the device of FIG. 1;

FIG. 2C is a partial side view of the circuit board of FIG. 2B;

DETAILED DESCRIPTION OF THE INVENTION

Figure 3:
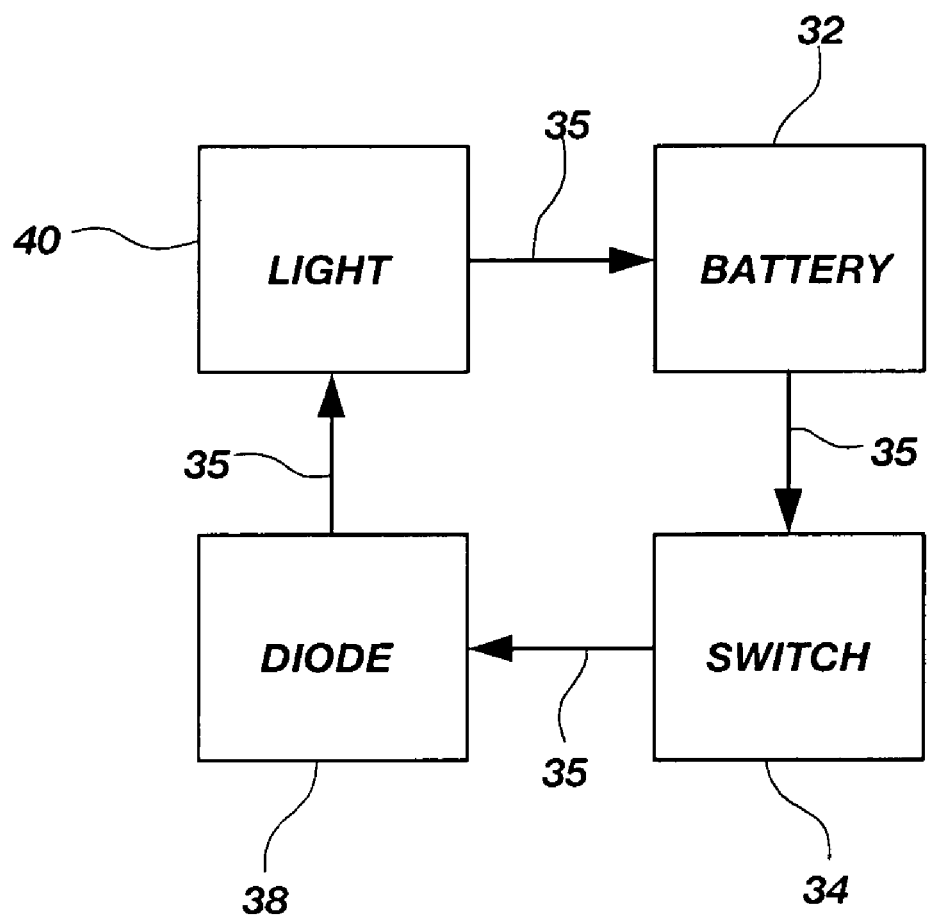
FIG. 3 is a functional block diagram which shows the pathway the electricity travels between the electrical components incorporated into the device of FIG. 1.

The present invention describes an inexpensive and efficient monitoring device that may be used to monitor the condition of a variety of objects. Using a dial-type sensing device with a needle, the present invention can warn users when an object reaches a specified condition or falls above or below a specified condition range.

As used herein, the term "dial-type thermometer" refers to a thermometer wherein the temperature is displayed on a circularly shaped face. The face displays a plurality of temperatures that corresponds to a range of temperatures to be sensed by the thermometer. Typically, the temperature on the face is indicated by the position of a needle relative to the displayed temperatures.

As used herein, the term "on" refers to the concept that the circuit contained in the present invention is closed. The closed circuit allows electricity to travel across the circuit.

As used herein, the term "off" refers to the concept that the circuit contained in the present invention is open. The open circuit prevents electricity from traveling across the circuit.

As used herein, the term "warning device" refers to a device that emits some sort of signal. The signal may be in the form of audio waves or sound, light energy, visually perceptive movement, or any type of signal that may be detected by human senses.

As used herein, the term "conventional circuitry" refers to an electrical circuit well known by those skilled in the art. The term is meant to encompass the components of electrical circuits that carry electricity.

Referring to FIG. 1, there is shown a top view of on exemplary embodiment of the alarm device generally at 10. The alarm device 10 comprises a cap 12 made of a translucent material, such as clear plastic, so that when the warning signal, such as a light, is on, the user will be able to detect the light through the cap 12. It will be appreciated by those skilled in the art that the cap may also be made of a transparent material. The alarm device 10 also comprises a housing 14. The housing 14 can be made of any suitable material that will conceal and protect the components of the alarm device 10 such as metal, plastic or other material.

Referring now to FIG. 2A, there is shown a thermometer 16 used in the alarm device 10. In the exemplary embodiment, the thermometer 16 is a dial-type thermometer 16. The thermometer 16 comprises a needle 18 that is electrically conductive. It will be appreciated by those skilled in the art that the needle 18 can be made electrically conductive by manufacturing the needle 18 with an electrically conductive material, such as a conductive metal or alloy, or by coating the needle 18 with an electrically conductive material. The needle 18 may be insulated from the rest of the thermometer 16, in a manner known by those of ordinary skill in the art, to prevent the electricity from flowing through the thermometer 16. In one example, the needle 18 may be made of a nonconductive material, such as plastic, and coated with a conductive material such that the portion of the needle 18 coated with the conductive material transmits electricity. The thermometer 16 further comprises a face 20. In the illustrated embodiment, the face 20 of the thermometer 16 is marked with indicia of a temperature gradient that corresponds to the intended temperature range of the thermometer 16. It will be appreciated that dial-type thermometers are well known by those of ordinary skill in the art.

Referring now to FIG. 2B, there is shown a circuit board 30 of the alarm device 10 of FIG. 1. The circuit board 30 comprises a power source 32. The power source 32 in the exemplary embodiment is a low-voltage battery, such as the lithium-style, long life battery commonly used in many electrical devices, such as watches and flashlights. It will be appreciated by those of ordinary skill in the art that other power sources 32 can be used such as alkaline batteries, solar cells or other low-voltage power source. The circuit board 30 also comprises a switch element 34. The switch element 34 comprises two conductive contact points 36, wherein the contact points 36 are separated from each other by the dielectric material of the circuit board 30, such that electricity does not flow from one contact point 36 to the other contact point 36. The contact points 36 are constructed of a rigid conductive material such that the needle 18 is impeded from further movement when the needle 18 physically touches the contact points 36. In another exemplary embodiment, the contact points 36 may be a more flexible material such as a fine conductive wire that does not impede the movement of the needle 18 past the contact point 36.

Referring now to FIG. 2C, there is shown a partial side view of the circuit board 30 of FIG. 2B showing the switch element 34. The contact points 36 extend below the surface of the circuit board 30. The extension of the contact points 36 below the circuit board 30 allows the electrically conductive needle 18 of the thermometer 16 to simultaneously physically touch the two contact points 36. In operation, the alarm device 10 of the present invention is typically "off" because the two contact points 36 of the switch element 34 are not contacted by the needle 18. When the electrically conductive needle 18 simultaneously touches both contact points 36, electricity travels from one contact point 36, through the electrically conductive needle 18, and to the other contact point 36. Thus, the switch comprising the switch element 34 and needle 18 is closed and the alarm device 10 is "on." When the alarm device 10 is "on," electric current flows through conventional circuit traces 42 in the alarm device 10 and causes a warning device 40 to emit a signal.

Referring back to FIG. 2B, the circuit board 30 also comprises a diode 38. The diode 38 may be a conventional diode or a light-emitting diode. It will be appreciated by those of ordinary skill in the art that when the power source 32 comprises a battery, the diode 38 may be omitted from the circuit board 30 because the battery provides DC current. The circuit board 30 also comprises an electronic warning device 40. In the exemplary embodiment, the warning device 40 is a lightbulb, but it will be appreciated by those skilled in the art that the electronic warning device 40 can be any type of device that emits a warning signal. Other types of warning devices 40 may include, but are not limited to, a horn or a buzzer, or any combination of warning devices. The power source 32, switch element 34, diode 38, and warning device 40 are interconnected by conventional circuit traces 42 well known by those of ordinary skill in the art. The conventional circuit traces 42 transmit current between the battery 32, the switch element 34, the diode 38, and the warning device 40.

In another exemplary embodiment, a manual switch in the form of a toggle switch 39 may be added to the conventional circuit traces 42. In this embodiment, the toggle switch 39 will have a lever (not shown) extending out of the exterior of the housing 14 such that when the specified temperature has been met and the alarm device 10 is "on", the lever (not shown) on the toggle switch 39 can be moved such that the conventional circuit traces 42 in the toggle switch 39 are open, thus turning the alarm device 10 "off." The addition of a toggle switch 39 thus allows a user to turn the alarm device 10 "off" when the functionality of the alarm device 10 is not needed.

Still referring to FIG. 2B, the circuit board 30 may be mounted for rotation inside of the housing 14 (not shown). Such rotational capability allows the entire circuit board 30 to be moved in either a clockwise or counterclockwise direction indicated by the arrows 41. The rotation of the circuit board 30 thus allows the position of the switch element 34 to be moved. The movement of the switch element 34 allows the predetermined temperature to be changed by the user. For example, rotation of the circuit board 30 in a counterclockwise direction allows the predetermined temperature to be lowered. Referring back to FIG. 2A, the circuit board 30 may be rotated such that the needle 18 contacts the switch element 34 (shown in FIG. 2B) at 140 degrees instead of 180 degrees. The rotational mounting of the circuit board 30 allows a user to rotate the circuit board 30 such that any specified target temperature within the range displayed on the face 20 may be set.

Referring now to FIG. 3, there is shown a functional block diagram which shows the flow of electricity between the electrical components incorporated into the alarm device 10 of the present invention. The power source 32 comprises a battery in this embodiment, but may also comprise a solar cell or an external power source. The power source 32 is connected to the switch element 34, such that when the switch element 34 is closed, electricity will flow from the power source 32 to the switch element 34 and from the switch element 34 to the diode 38. It is well known by those of ordinary skill in the art that the diode 38 restricts the flow of electricity to one direction as indicated by the arrows 35. The electricity will flow from the diode 38 to the warning device 40, which in the exemplary embodiment is a light. The electricity will flow from the warning device 40 back to the power source 32.

Figure 4:
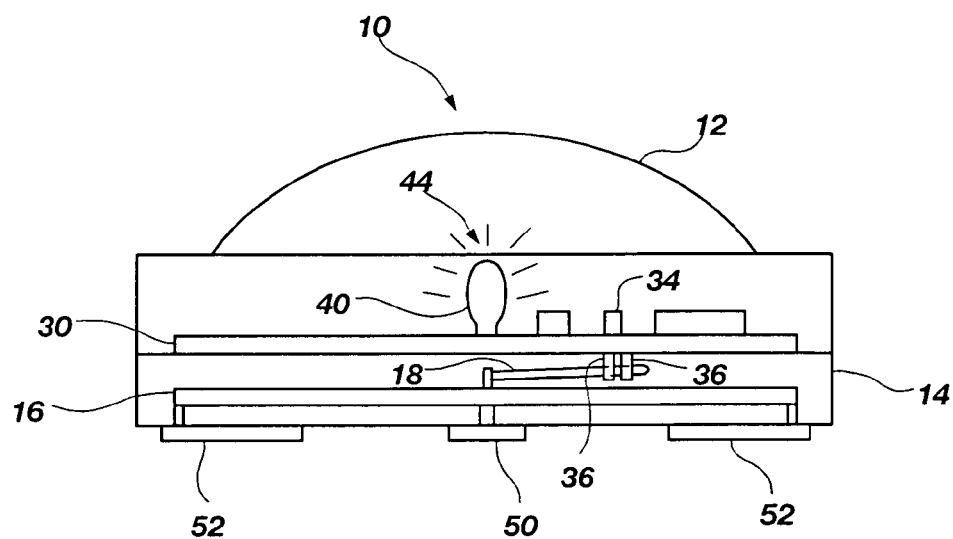
FIG. 4 is a side view of the exemplary embodiment of the device of FIG. 1.

Referring now to FIG. 4, there is shown a side view of the alarm device 10 shown in FIG. 1. The thermometer 16 and the circuit board 30 are shown located inside of the housing 14. In the illustrated embodiment, the cap 12 is raised such that when light 44 is given off by the warning device 40, the light 44 is refracted and thus may be detected by a user from the side of the alarm device 10, as well as from the top of the alarm device 10. The alarm device 10 is shown with the needle 18 touching the two contact points 36, such that the switch comprising the switch element 34 and needle 18 is closed and the alarm device 10 is "on." When the switch element 34 is closed, the warning device 40 emits a warning signal such as light, shown by lines 44.

The side view also shows a temperature-sensing device 50 such as a bimetallic spring. It will be appreciated by those of ordinary skill in the art that the temperature-sensing device 50 is integral with the dial-type thermometer 16, such that the needle 18 on the thermometer 16 will be moved as the temperature detected by the temperature-sensing device 50 changes. In the illustrated embodiment, the temperature-sensing device 50 may include a heat sink to contact the surface of an object such that the temperature of the surface of the object is measured. The illustrated embodiment further comprises a pair of magnets 52, wherein the magnets 52 are attached to the housing 14 of the alarm device 10. The magnets 52 may be used to magnetically attach the alarm device 10 to any ferrous surface, such that the temperature of the ferrous surface will be monitored.

Figure 5:
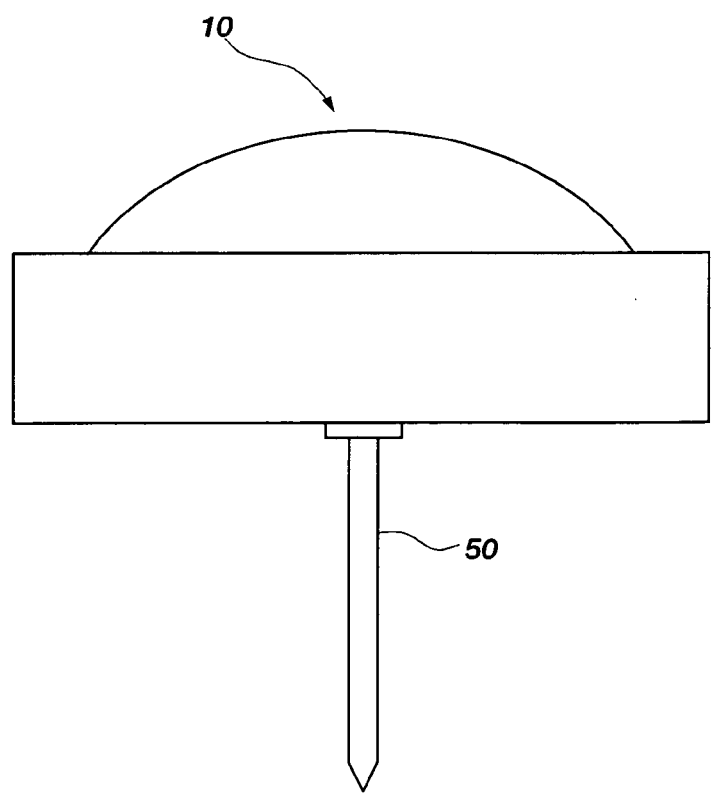
FIG. 5 is a side view of an additional exemplary embodiment of the present invention.

The temperature-sensing device 50 could also be configured in many other ways known by those skilled in the art for a variety of uses. Referring to FIG. 5, there is shown a side view of another exemplary embodiment of the present invention. In this exemplary embodiment, the temperature-sensing device 50 is configured with a heat sink in the form of a probe. The probe has a wide variety of uses, including, but not limited to, sensing the temperature of liquids, foods such as bratwursts, hamburgers, hot dogs, fish, chicken or any other material in which the probe may be inserted. This embodiment may be useful to grilling enthusiasts to ensure that the interior of the meat being cooked has reached a temperature sufficient to ensure that the meat is thoroughly cooked. It will be further appreciated by those of ordinary skill in the art that the temperature-sensing device 50, such as the probe, may be connected to the alarm device 10 in a manner such that the alarm device 10 is located remote from the temperature-sensing device 50. This embodiment allows the temperature-sensing device 50 to be inserted into the object to be measured such that the alarm device 10 is not subjected to the high heat of the object being measured.

Figure 6:
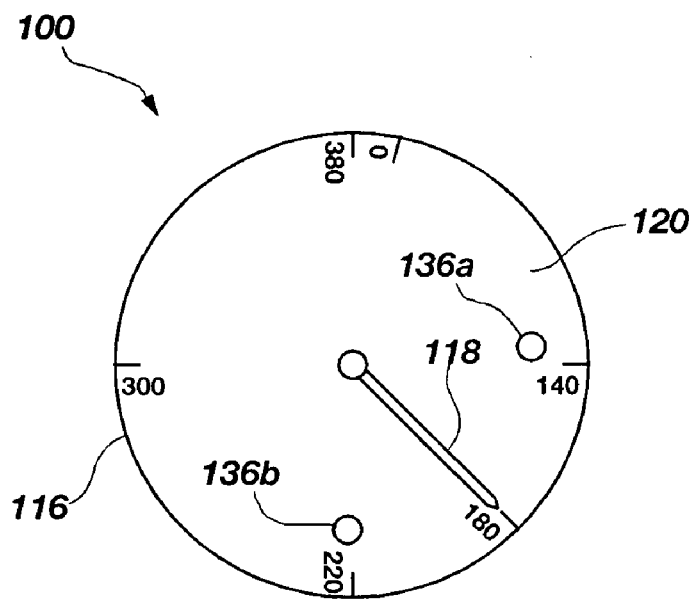
FIG. 6 is a top view of another exemplary embodiment of an alarm device of the present invention.

Referring now to FIG. 6, there is shown a top view of another exemplary embodiment of an alarm device generally at 100. The elements of the warning device 100 have the same or similar reference numerals as the elements of the alarm device previously described herein. The alarm device 100 includes a conductive needle 118 and a face 120 of the alarm device 100 is configured as a dial-type thermometer 116. The alarm device 100 also includes two independently adjustable contact points 136a and 136b that may be used to set a predetermined high temperature and a predetermined low temperature that the conductive needle 118 will contact. The contact points 136a or 136b are rotatably attached to a portion of a housing (such as the lens cover or cap as depicted in FIG. 4) of the alarm device 100, such that the two temperatures at which the alarm device 100 is activated can be adjusted. In this manner, the alarm device 100 may be used to monitor a temperature range and notify a user when the monitored temperature falls above or below the temperature range. In other exemplary embodiments, the face 120 of the alarm device 100 may comprise other dial-type devices including, but not limited to, a gauge or any other alarm device that includes a rotatable elongate element, such as a needle, operatively attached to a sensor.

Figure 7:
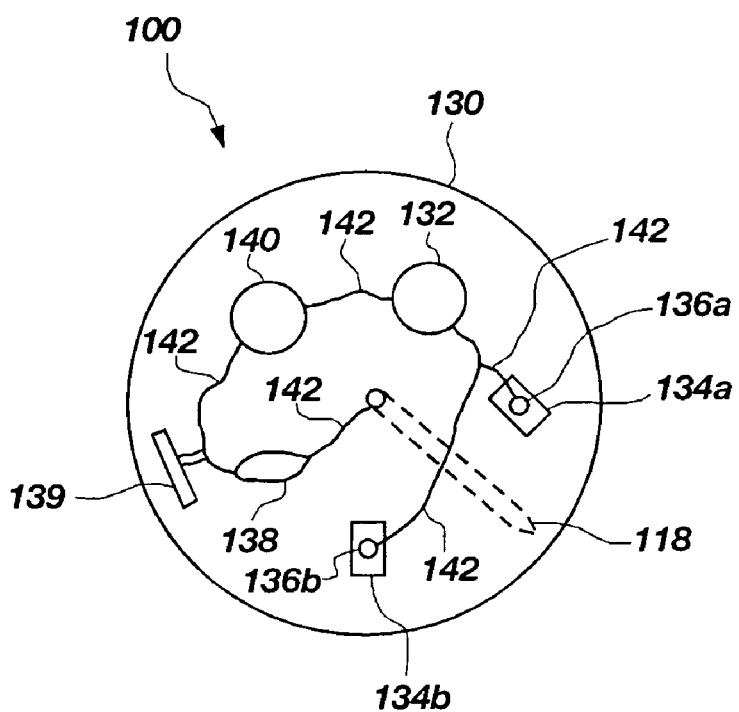
FIG. 7 is a top view of one embodiment of a circuit board of the alarm device of FIG. 6.

Referring now to FIG. 7, there is shown one exemplary embodiment of a circuit board 130 of the alarm device 100 of FIG. 6. The contact points 136a and 136b of the alarm device 100 are each operatively connected to and make up a portion of a switch element 134a and 134b, respectively. When the sensed temperature varies outside of the range defined by contact points 136a and 136b, the conductive needle 118 contacts one of the contact points 136a and 136b and activates one of the switch elements 134a or 134b of the alarm device 100. The contact points 136a and 136b may be a rigid conductive material or a fine conductive wire, as previously described herein. The conductive needle 118 is constructed of or coated with a conductive material as previously described herein. An electric circuit of the circuit board 130 is closed when the conductive needle 118 contacts one of the contact points 136a or 136b and activates the switch element 134a or 134b of the circuit board 130. The circuit board 130 also includes a power source 132, a warning device 140 and a diode 138. The conductive needle 118, switch elements 134a and 134b, the power source 132, the warning device 140 and the diode 138 are interconnected by conventional circuit traces 142 as is known by those of ordinary skill in the art, wherein the circuit traces 142 transmit current between the various components of the circuit board 130. A switch 139, which may comprise a toggle switch, is also connected to the circuit of the circuit board 130 such that the functionality of the alarm device 100 can be turned "off" when not needed. In another exemplary embodiment, the alarm device 100 may be configured to include a single contact point 136 and a single switch element 134 for sensing a single temperature.

Figure 8:
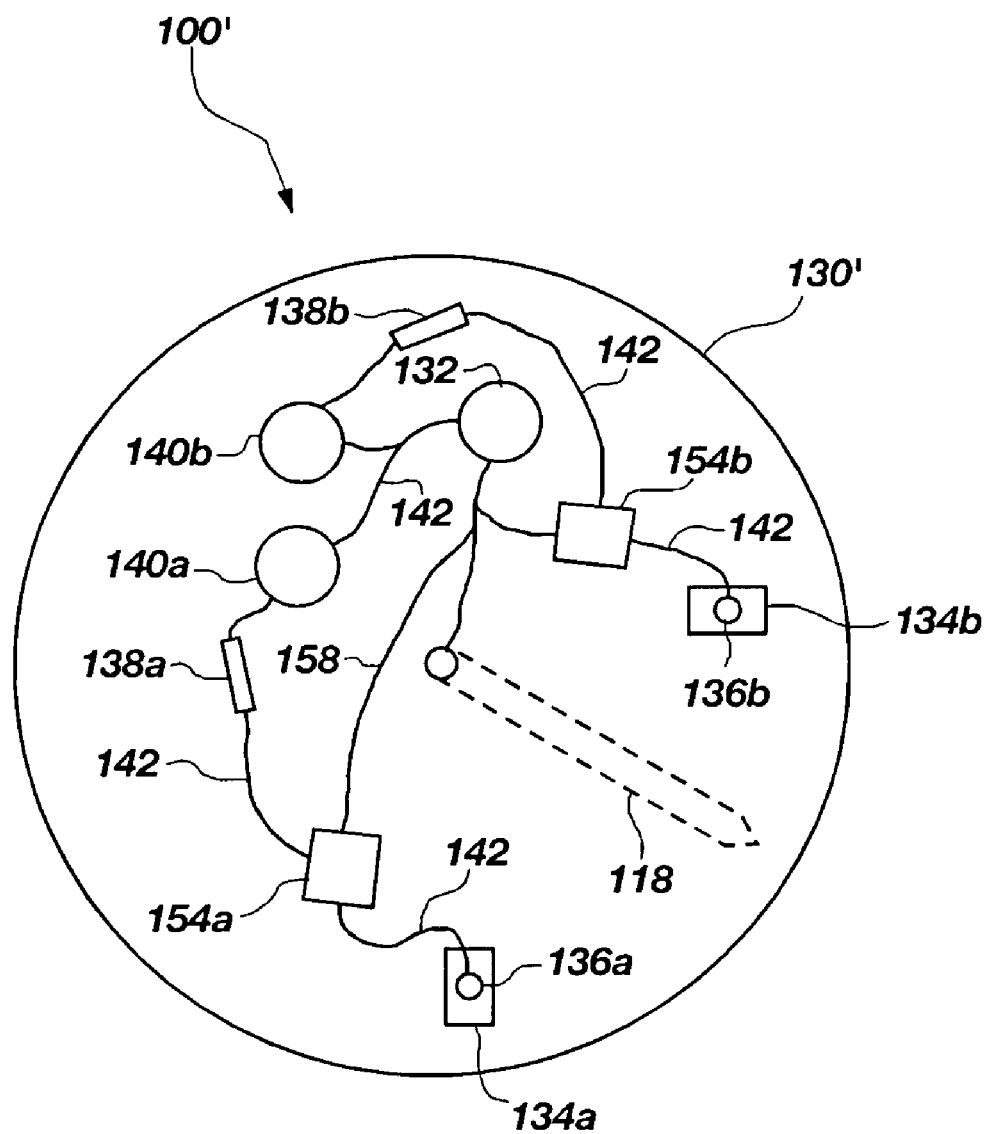
FIG. 8 is a top view of another embodiment of the alarm device of FIG. 6.

In another exemplary embodiment, latch circuits 154a and 154b are included in alarm device 100' as illustrated in FIG. 8. The components of the alarm device 100' of FIG. 8 are substantially the same as the components of the alarm device 100 of FIG. 7. The latch circuits 154a and 154b of the alarm device 100' allow the warning device 140 to continue to receive current when the conductive needle 118 is not contacting one of the contact points 136a or 136b, such as when the conductive needle 118 has sensed a temperature outside of the temperature range and moved beyond the contact points 136a or 136b. Activation of one of the switch elements 134a or 134b provides current to latch circuit 154a or 154b through conductive trace 142. The latch circuit 154a or 154b is a device that changes to an open position and allows the passage of current through the latch circuit 154a or 154b and to diode 138a or 138b through conductive traces 142. The latch circuit 154a or 154b continues to allow the passage of current from the power source 132 to the diode 138a or 138b in the absence of the conductive needle 118 contacting the contact point 136a or 136b. In another exemplary embodiment, the circuit board 130' of the alarm device 100' may be configured to include a single contact point 136a and a single switch element 134a for sensing a single temperature.

In the exemplary embodiment of FIG. 8, the switch elements 134a and 134b may each be activated independently such that the warning devices 140a or 140b are each activated independently. The warning devices 140a or 140b may comprise a light, a flashing light, a light emitting diode, a horn, a buzzer, a bell, a recorded voice, or any combinations thereof. Further, one warning device 140a may be different than the other warning device 140b such that a user of the alarm device 100' can determine whether switch element 134a (high) or 134b (low) was activated, i.e., the higher or lower temperature, respectively, by the activation of the distinct signals. Further, the alarm devices 100 and 100' may be contained within the housing 14 and cap 12 of FIG. 4.

Figure 9:
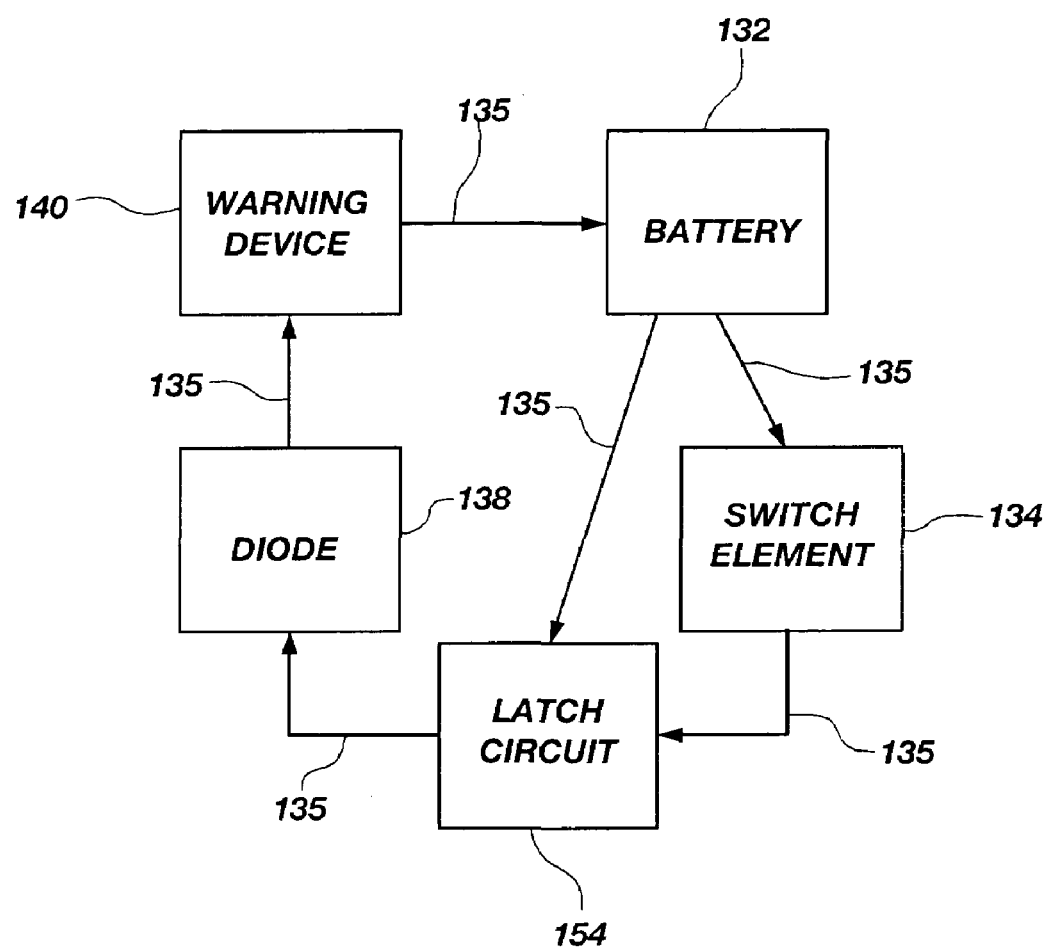
FIG. 9 is a functional block diagram which shows a path the electricity travels between the electrical components of the alarm device of FIG. 7.

Referring now to FIG. 9, there is shown a block diagram depicting the flow of electricity between the electrical components of the alarm device 100 of FIG. 8. In the exemplary embodiment, the power source 132 is a battery, but in other exemplary embodiments may be a solar cell or an external power source. For ease of illustration, the block diagram depicts the flow of electricity through one of the switch elements 134. The power source 132 is electrically connected to the switch element 134 and the latch circuit 154 such that when the switch element 134 is closed, electricity flows from the power source 132 to the switch element 134 and to the latch circuit 154. Once current is applied to the latch circuit 154, the latch circuit 154 is triggered and current continues to flow freely from the power source 132 and to the diode 138 until the current is stopped with the switch 139 (FIG. 10) or the current falls below a minimum value. The diode 138 restricts the flow of electricity in one direction as indicated by arrows 135. In another exemplary embodiment, the diode 138 may be omitted. The electricity flows from the diode 138 to the warning device 140, which in the exemplary embodiment is a light, but may be other warning devices as previously described herein. The circuit is completed by electricity flowing from the warning device 140 to the power source 132.

Figure 10:
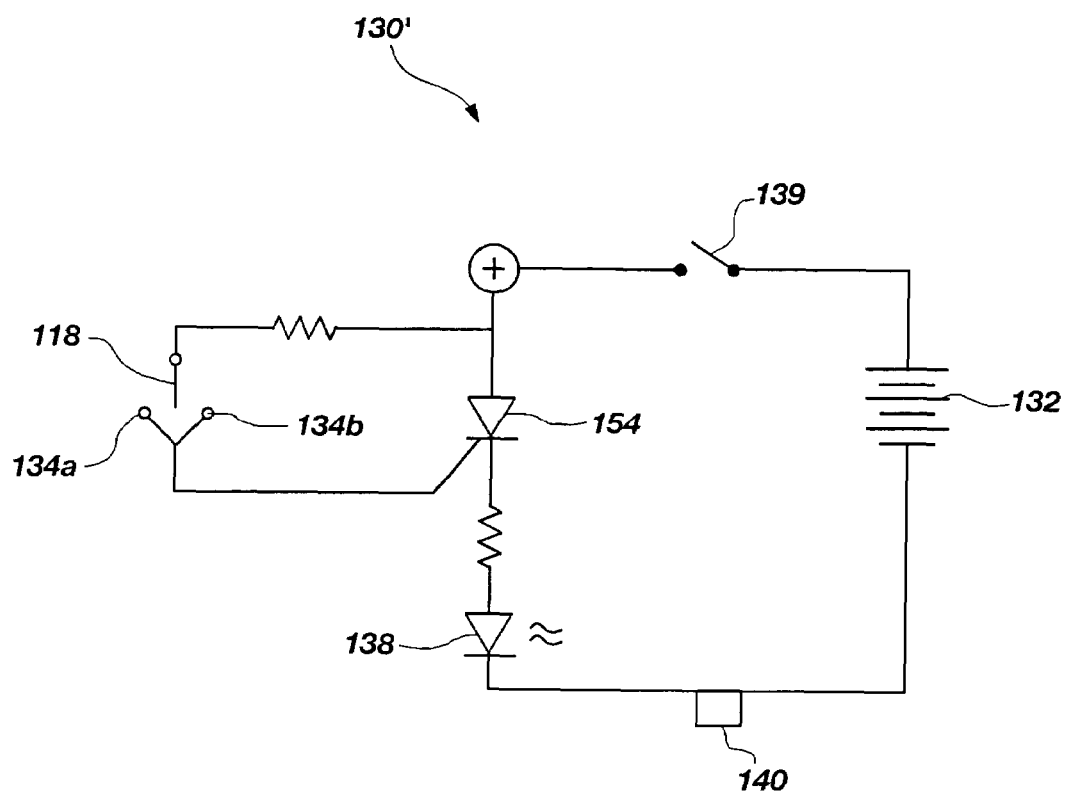
FIG. 10 is a diagram of an electrical circuit of the alarm device of FIG. 6.

Referring now to FIG. 10, there is shown a schematic diagram of the circuit board 130' of FIG. 8. When the conductive needle 118 activates one of the switch elements 134a or 134b, one of the latch circuits 154a or 154b is triggered and allows current to bypass the switch elements 134a or 134b and continually flow from the power source 132 to the warning device 140. The latch circuit 154 may be a silicon-controlled rectifier or a gate-turn-off thyristor as is known in the art.

It will be recognized by those of ordinary skill in the art that high temperatures may damage certain components of the alarm device 10, 100 or 100'. For example, high temperatures may cause damage to the power source 132 or the warning device 140. These problems can be solved in other exemplary embodiments of the alarm device 10, 100 or 100' wherein the alarm device 10, 100 or 100' is designed such that only the temperature-sensing device 50, such as a heat sink (FIG. 4), contacts the surface of the monitored object. In these exemplary embodiments, air circulation helps keep the remaining components of the alarm device 10, 100 or 100' at ambient temperature.

In another exemplary embodiment, the power source 132 may be thermally insulated from the monitored object such that the power source 132 is not subjected to high heat. These exemplary embodiments are not exhaustive of ways to protect the components of the alarm devices 10, 100 or 100' from heat or other environmental conditions. It will be appreciated by those of ordinary skill in the art that other embodiments designed to protect the components of the warning device 100 or 100' from heat are encompassed by the present invention.

It will be further apparent by those of ordinary skill in the art that the exemplary embodiments of the alarm device 10, 100 or 100' may be used in many applications including an industrial setting. Because the alarm devices 10, 100 or 100' are inexpensive to manufacture, a plurality of alarm devices 10, 100 or 100' may be attached to many pieces of equipment without imposing a large cost on the user. The alarm devices 10, 100 or 100' may be used to alert workers at an industrial plant when the temperature of the surface of a motor, pump, gearbox or any other piece of machinery exceeds a specified temperature. The sensor of the alarm devices 10, 100 or 100' may also be configured to monitor other conditions, such as pressures. For instance, the alarm devices 10, 100 or 100' may be configured to measure and monitor a pressure. Thus, the alarm device 10, 100 or 100' may include a pressure gauge such that pressures including, but not limited to, oil pressure, air pressure or a water pressure can be monitored. The gauge may also be an RPM gauge or a liquid level detector gauge, such as a gasoline gauge, to monitor other conditions. Because the alarm devices 10, 100 or 100' comprise an independent power source 32 or 132, the alarm device 10, 100 or 100' are portable and no external wiring is needed.

The alarm devices 10, 100 or 100' described herein also have many consumer uses. For example, the alarm devices 10, 100 or 100' may be used by outdoor grilling enthusiasts. The alarm devices 10, 100 or 100' may be placed on a grill hood or cover and used to alert the cook that a target temperature has been reached and that it is time to start cooking. In other exemplary embodiments, the alarm devices 10, 100 or 100' may be used make the user aware of a particular measurement on any alarm device having an elongate arm that indicates any sensed condition. In yet a further exemplary embodiment, the alarm devices 10, 100 or 100' may be used as a heat alarm or in conjunction with a smoke alarm for a house to monitor the temperature in the house.

While the present invention has been described with reference to various exemplary embodiments, the invention is not meant to be so limited. In each of its various embodiments, the apparatus and methods of the present invention provide an inexpensive and efficient alarm device for sensing a condition or monitoring the temperature of an object, and the present invention may be carried out using embodiments different from those specifically described herein. Therefore, the scope of the present invention is not limited by the description provided by the present specification, but is defined by the appended claims.

What is claimed is:

1. An alarm device, comprising:
    a monitoring device, comprising a sensor and a rotatable elongate element for indicating a sensed condition, wherein the rotatable elongate element for indicating the sensed condition is rotatable by the sensor responsive to a change in the sensed condition;
    wherein at least a portion of the rotatable elongate element is electrically conductive;
    a circuit connecting a power source, at least one switch element and at least one warning device, wherein the at least one switch element is positioned relative to the rotatable elongate element such that when a selected condition is sensed by the sensor, the rotatable elongate element for indicating the sensed condition physically contacts the at least one switch element allowing an electric current from the power source to pass through the rotatable elongate element;
    wherein the at least one switch element is configured to rotate to adjust the selected condition at which the rotatable elongate element will contact the at least one switch element; and
    wherein the at least one warning device is configured to emit a signal when the electric current is transmitted to the at least one warning device.

2. The alarm device of claim 1, wherein the rotatable elongate element is a needle of a gauge.

3. The alarm device of claim 1, wherein the at least one warning device is selected from the group consisting of a light, a flashing light, a light emitting diode, a horn, a buzzer, a bell, a recorded voice, or any combinations thereof.

4. The alarm device of claim 1, wherein a circuit trace of the circuit is connected to the rotatable elongate element.

5. The alarm device of claim 1, wherein the at least one switch element comprises:
    a first switch element, wherein the first switch element is positioned relative to the rotatable elongate element such that when a first selected condition is sensed by the sensor, the rotatable elongate element for indicating the sensed condition physically contacts the first switch element allowing the electric current from the power source to pass through the rotatable elongate element; and
    a second switch element, wherein the second switch element is positioned relative to the rotatable elongate element such that when a second selected condition is sensed by the sensor, the rotatable elongate element for indicating the sensed condition physically contacts the second switch element allowing thecm electric current from the power source to pass through the rotatable elongate element.

6. The alarm device of claim 5, wherein the at least one warning device comprises:
    a first warning device, wherein the first warning device is configured to emit a first signal responsive to the rotatable elongate element contacting the first switch element; and
    a second warning device, wherein the second warning device is configured to emit a second signal responsive to the rotatable elongate element contacting the second switch element.

7. The alarm device of claim 1, further comprising a manual switch connected to the circuit.

8. The alarm device of claim 1 wherein the sensor is a thermometer, a pressure sensor or a liquid level sensor.

9. An alarm device, comprising:
    a monitoring device, comprising a sensor and a rotatable elongate element for indicating a sensed condition, wherein the rotatable elongate element for indicating the sensed condition is rotatable by the sensor responsive to a change in the sensed condition;
    a circuit connecting a power source, at least one switch element, at least one latch circuit and at least one warning device, wherein the at least one switch element is positioned relative to the rotatable elongate element such that when a selected condition is sensed by the sensor, the rotatable elongate element for indicating the sensed condition contacts the at least one switch element allowing an electric current from the power source to pass through the rotatable elongate element; and
    wherein the at least one warning device is configured to emit a signal when the electric current is transmitted to the at least one warning device.

10. The alarm device of claim 9, wherein at least a portion of the rotatable elongate element is electrically conductive.

11. The alarm device of claim 9, wherein the at least one switch element is configured to rotate to adjust the selected condition at which the rotatable elongate element will contact the at least one switch element.

12. The alarm device of claim 9, wherein the at least one switch element comprises:
    a first switch element, wherein the first switch element is positioned relative to the rotatable elongate element such that when a first selected condition is sensed by the sensor, the rotatable elongate element for indicating the sensed condition physically contacts the first switch element allowing the electric current from the power source to pass through the rotatable elongate element; and
    a second switch element, wherein the second switch element is positioned relative to the rotatable elongate element such that when a second selected condition is sensed by the sensor, the rotatable elongate element for indicating the sensed condition physically contacts the second switch element allowing the electric current from the power source to pass through the rotatable elongate element.

13. The alarm device of claim 12, wherein the at least one latch circuit comprises:
   a first latch circuit electrically connected to the first switch element; and
   a second latch circuit electrically connected to the second switch element.

14. The alarm device of claim 9, further comprising a manual switch connected in the circuit.

15. The alarm device of claim 9, wherein the at least one warning device is selected from the group consisting of a light, a flashing light, a light emitting diode, a horn, a buzzer, a bell, a recorded voice, or any combinations thereof.

16. The alarm device of claim 9, wherein a circuit trace of the circuit is connected to the rotatable elongate element.

17. The alarm device of claim 9, wherein the at least one warning device comprises:
   a first warning device for emitting a first warning signal at a first selected condition; and
   a second warning device for emitting a second warning signal at a second selected condition.

18. A temperature-sensing device, comprising:
   a dial-type thermometer, comprising a temperature sensor and a rotatable elongate element for indicating a sensed temperature, wherein the rotatable elongate element for indicating the sensed temperature is rotatable by the temperature sensor responsive to a change in the sensed temperature;
   wherein at least a portion of the rotatable elongate element is electrically conductive;
   a circuit connecting a power source, at least one switch element and at least one warning device, wherein the at least one switch element is positioned relative to the rotatable elongate element such that when a selected temperature is sensed by the temperature sensor, the rotatable elongate element for indicating the sensed temperature physically contacts the at least one switch element allowing an electric current from the power source to pass through the rotatable elongate element; and
   wherein the at least one switch element is configured for rotation to adjust the selected temperature at which the rotatable elongate element will contact the at least one switch element.

19. The temperature-sensing device of claim 18, wherein the circuit further comprises at least one latch circuit.

20. The temperature-sensing device of claim 18, wherein a circuit trace of the circuit is connected to the rotatable elongate element.

* * * * *